United States Patent [19]

Monnens

[11] Patent Number: 5,531,332

[45] Date of Patent: Jul. 2, 1996

[54] REMOTE CONTROL DEVICE CARROUSELS

[76] Inventor: Randy E. Monnens, 1240 Ruby La., Shakopee, Minn. 55379

[21] Appl. No.: 304,836

[22] Filed: Sep. 13, 1994

[51] Int. Cl.$^6$ ..................................... A47F 7/00
[52] U.S. Cl. ..................... 211/13; 211/164; 211/DIG. 1; 248/309.4
[58] Field of Search .................... 211/13, 164, DIG. 1; 248/206.5, 205.2, 176, 309.4

[56] References Cited

U.S. PATENT DOCUMENTS

| | | | |
|---|---|---|---|
| 4,712,693 | 12/1987 | Striplin | 211/13 X |
| 4,838,505 | 6/1989 | Lowe | 248/205.2 X |
| 4,852,746 | 8/1989 | Wells et al. | 248/205.2 X |
| 5,125,516 | 6/1992 | McKenna | 211/13 |
| 5,337,904 | 8/1994 | Goldberg | 211/13 |
| 5,341,941 | 8/1994 | Marlor | 211/13 |

*Primary Examiner*—Robert W. Gibson, Jr.

[57] ABSTRACT

A remote control device carousel comprising: a base formed in a generally rectangular configuration with an upper surface and a lower surface and positioned horizontally in the operative orientation, two brackets being formed as generally planar members each being centrally positioned upon the upper surface of the base, each bracket including a generally circular shaped aperture; and a rotatable block formed as a generally rectangular shaped hollow box, the outer surface of the block including a thin layer of magnetic sheet metal, each of the ends of the block including an aperture, the block being affixed between the brackets with cooperatively coupled nuts and bolts.

2 Claims, 4 Drawing Sheets

REMOTE CONTROL DEVICE CARROUSELS

BACKGROUND OF THE INVENTION

1. Field of the Invention

The present invention relates to remote control device carrousels and more particularly pertains to retaining multiple remote control devices on rotatable carrousels to permit easy access to the user.

2. Description of the Prior Art

The use of remote control device holders is known in the prior art. More specifically, remote control device holders heretofore devised and utilized for the purpose of retaining remote control devices in protective containers are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. Des. 324,810 to Moye, Sr. a holder for remote control device.

U.S. Pat. No. 4,848,609 to Meghnot discloses an adjustable holder for tv, stereo and vcr remote control units.

U.S. Pat. No. 4,815,683 to Ferrante discloses a holder for remote control units for tv, stereo and vcr and the like.

U.S. Pat. No. 5,192,042 to Wotring discloses a holder for vcr and tv remote controls.

Lastly, U.S. Pat. No. 5,244,173 to Kulyk discloses a holder for remote control units.

In this respect, the remote control device carrousels according to the present invention substantially depart from the conventional concepts and designs of the prior art, and in doing so provides an apparatus primarily developed for the purpose of retaining multiple remote control devices on rotatable carrousels to permit easy access to the user.

Therefore, it can be appreciated that there exists a continuing need for new and improved remote control device carrousels which can be used for retaining multiple remote control devices on rotatable carrousels to permit easy access to the user. In this regard, the present invention substantially fulfills this need.

SUMMARY OF THE INVENTION

In view of the foregoing disadvantages inherent in the known types of remote control device holders now present in the prior art, the present invention provides improved remote control device carrousels. As such, the general purpose of the present invention, which will be described subsequently in greater detail, is to provide a new and improved remote control device carrousel and method which has all the advantages of the prior art and none of the disadvantages.

To attain this, the present invention essentially comprises a new and improved remote control device carousel comprising, in combination: a base formed in a generally rectangular configuration with an upper surface, a lower surface and a small thickness therebetween, the base being positioned horizontally in the operative orientation and including parallel long side edges and parallel short side edges, a first long side edge constituting the front edge of the base, a second long side edge constituting the rear edge of the base, the two short side edges constituting the side edges of the base, the base having two generally rectangular shaped risers positioned on its upper surface, the risers being shaped as generally rectangular shaped boxes with parallel short front and rear faces, the risers also having long parallel side faces, each riser being positioned parallel to and a short distance from each side edge of the block, the risers having a shorter length than each side edge of the base and being centrally positioned between the front and rear edge thereof; two brackets being formed as generally planar triangular shaped members, each bracket being centrally positioned upon the upper surface of each riser, the point of each triangle being positioned upwardly, the linear side edge opposite the point being positioned upon the riser, each bracket including a generally circular shaped aperture located a short distance from its apex; a rotatable block formed as a generally rectangular shaped hollow box, the block having a front face, a rear face, two side faces, a top face and a bottom face, the outer surface of the top, bottom, and rear faces of the block including a thin layer of magnetic sheet metal, each of the side faces including an aperture at its center point, the block being affixed between the triangular brackets with cooperatively coupled nuts and bolts, washers and bushings, the bushings being positioned between each side face of the block and the inner surface of each bracket, the washers being positioned on the outer surface of each bracket around the apertures, the bolts being positioned through the washers, bushings, block and brackets with the apertures in horizontal alignment, the nuts firmly couple the bolts in place, the block being adapted to rotate easily when touched by the user; and a plurality of imitation plastic remote control devices formed in a generally planar rectangular orientation, the imitation devices having an upper surface and a lower surface, the lower surface including a generally rectangular shaped magnetic strip with a self adhesive material affixed centrally thereupon, the imitation plastic devices adapted to evenly distributed weight on the carousel with less than a full complement of four functional remote control devices being mounted thereupon.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved remote control device carrousels which have all the advantages of the prior art remote control device holders and none of the disadvantages.

It is another object of the present invention to provide new and improved remote control device carrousels which may be easily and efficiently manufactured and marketed.

It is further object of the present invention to provide new and improved remote control device carrousels which are of durable and reliable constructions.

An even further object of the present invention is to provide new and improved remote control device carrousels which are susceptible of a low cost of manufacture with regard to both materials and labor, and which accordingly are then susceptible of low prices of sale to the consuming public, thereby making such remote control device carrousels economically available to the buying public.

Still yet another object of the present invention is to provide new and improved remote control device carrousels which provide in the apparatuses and methods of the prior art some of the advantages thereof, while simultaneously overcoming some of the disadvantages normally associated therewith.

Still another object of the present invention is to retain multiple remote control devices on rotatable carrousels to permit easy access to the user.

Lastly, it is an object of the present invention to provide new and improved a remote control device carousel comprising: a base formed in a generally rectangular configuration with an upper surface and a lower surface and positioned horizontally in the operative orientation, two brackets being formed as generally planar members each being centrally positioned upon the upper surface of the base, each bracket including a generally circular shaped aperture; and a rotatable block formed as a generally rectangular shaped hollow box, the outer surface of the block including a thin layer of magnetic sheet metal, each of the ends of the block including an aperture, the block being affixed between the brackets with cooperatively coupled nuts and bolts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
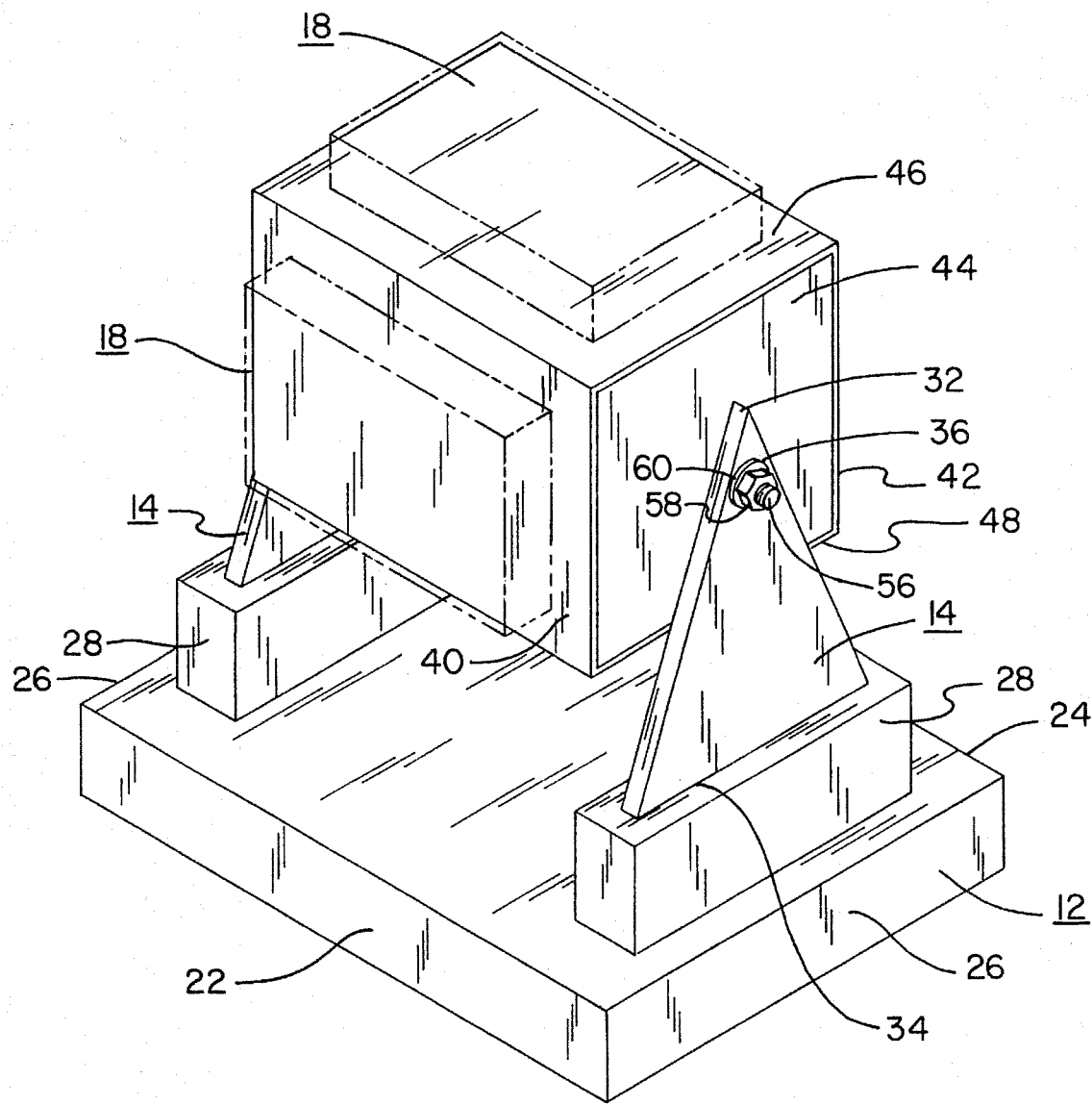
FIG. 1 is a perspective view of the preferred embodiment of the remote control device carousel constructed in accordance with the principles of the present invention.

With reference now to the drawings, and in particular to FIG. 1 thereof, the preferred embodiment of the new and improved remote control device carrousels embodying the principles and concepts of the present invention and generally designated by the reference numeral 10 will be described.

The present invention, the remote control device carousel 10 is comprised of a plurality of components. Such components in their broadest context include a base 12, two brackets 14, a rotatable block 16 and imitation plastic remote control devices 18.

More specifically, a base 12 is formed in a generally rectangular configuration with an upper surface, a lower surface and a small thickness therebetween. The base is positioned horizontally in the operative orientation and includes parallel long side edges 22, 24 and parallel short side edges 26. A first long side edge 22 constitutes the front edge of the base. A second long side edge 24 constitutes the rear edge of the base. The two short side edges 26 constitute the sides of the base. Note that the symmetrical structure of the apparatus allows the user easy access to remote controls from a variety of positions with respect to the rotatable block. Note FIG. 1.

Figure 2:
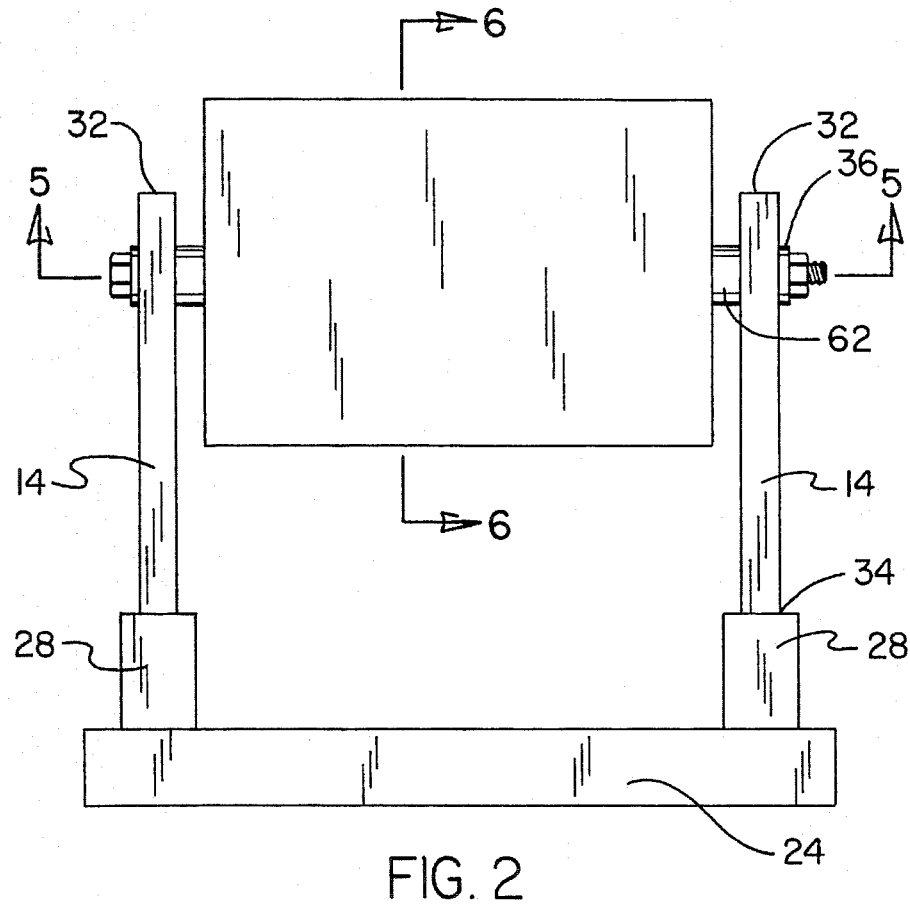
FIG. 2 is a front perspective view of the remote control device carousel shown in FIG. 1.
Figure 3:
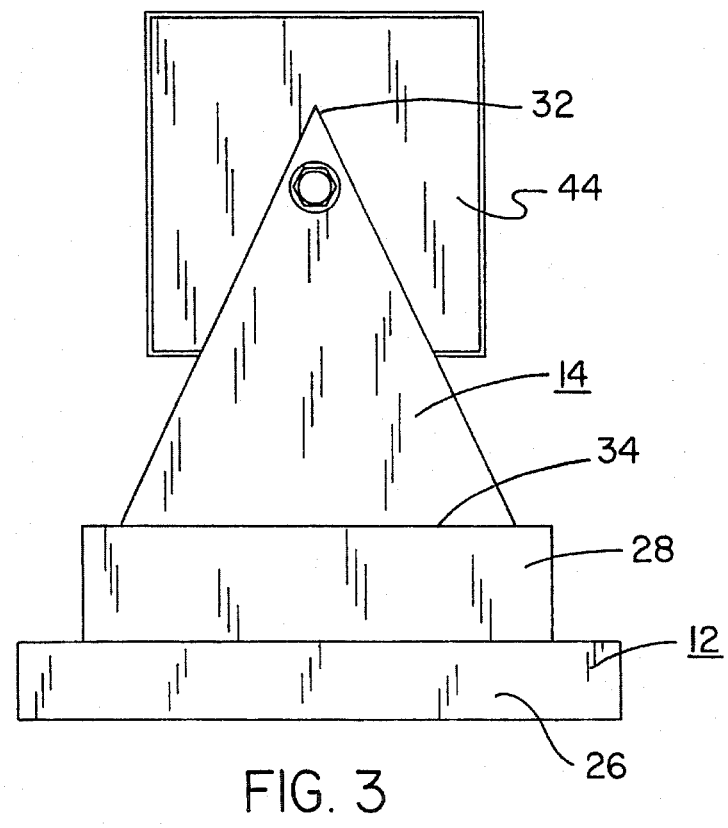
FIG. 3 is a side perspective view of the remote control device carousel shown in FIG. 1.

The base 12 has two generally rectangular shaped risers 28 positioned on its upper surface. The risers are shaped as generally rectangular shaped boxes with parallel short front and rear faces. The risers also have long parallel side faces. The height of the risers slightly exceed their width. Each riser is positioned parallel to, and a short distance from each side edge of the block. The risers have a shorter length than each side edge of the base and are centrally positioned therebetween. The risers provide the necessary clearance area for rotation of the block in the operative orientation. The elevated height provided by the risers also enhances the users' viewing angle. Note FIGS. 1, 2 and 3.

Two brackets 14 are formed as generally planar triangular shaped members. Each bracket is centrally positioned upon the upper surface of each riser. The point 32 of each triangle is positioned facing upwardly. The linear side edge 34 opposite the point is positioned upon the riser. Each bracket includes a generally circular shaped aperture 36 located a short distance from its apex. This orientation provides optimal weight distribution throughout the bracket. The brackets are fabricated of sturdy materials to provide the block with a strong and stable rotation base. Note FIGS. 1 and 3.

Figure 6:
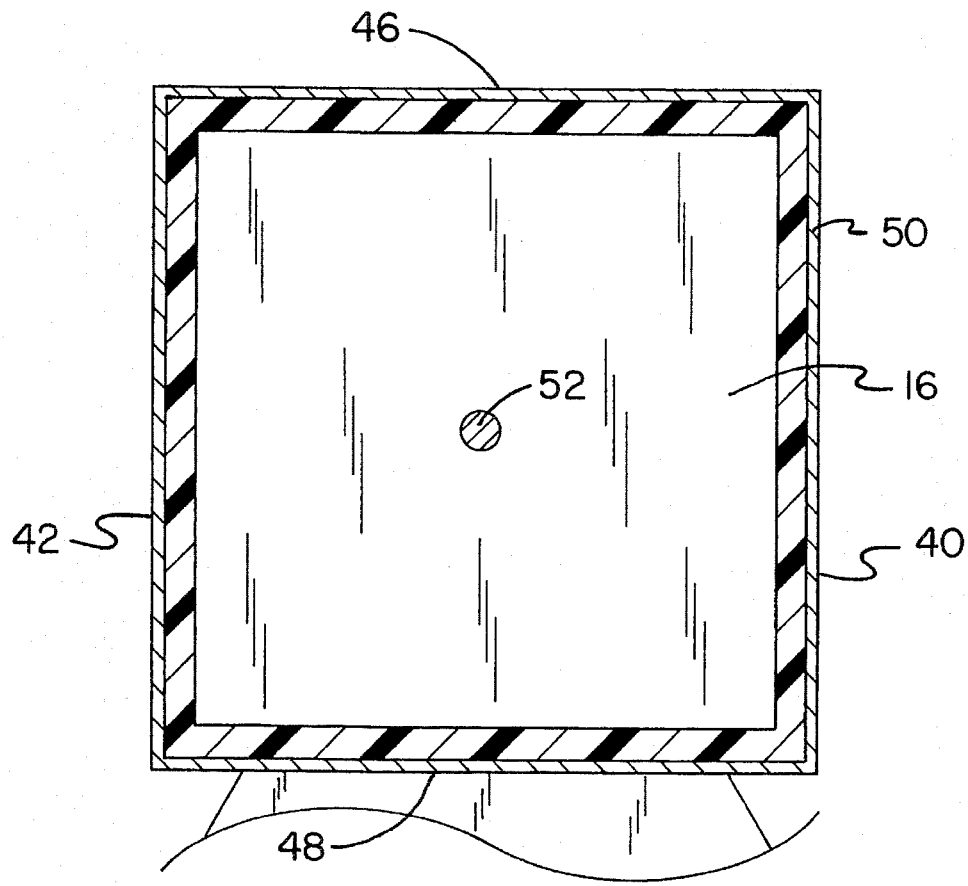
FIG. 6 is a cross sectional view of the apparatus taken along line 6.6 of FIG. 2.

A rotatable block 16 is formed as a generally rectangular shaped hollow box. The block has a front face 40, a rear face 42 and two side faces 44. The block also has a top face 46 and a bottom face 48. The outer surface of the top, bottom, and rear faces of the block include a thin layer of magnetic sheet metal 50. The magnetic sheet metal permits affixation of remote control devices in the operative orientation. Each of the side faces of the block include an aperture 52. Note FIG. 6. Since the block is rotatable, the relative position of each side face varies during use. Note FIGS. 1, 2 and 3.

Figure 4:
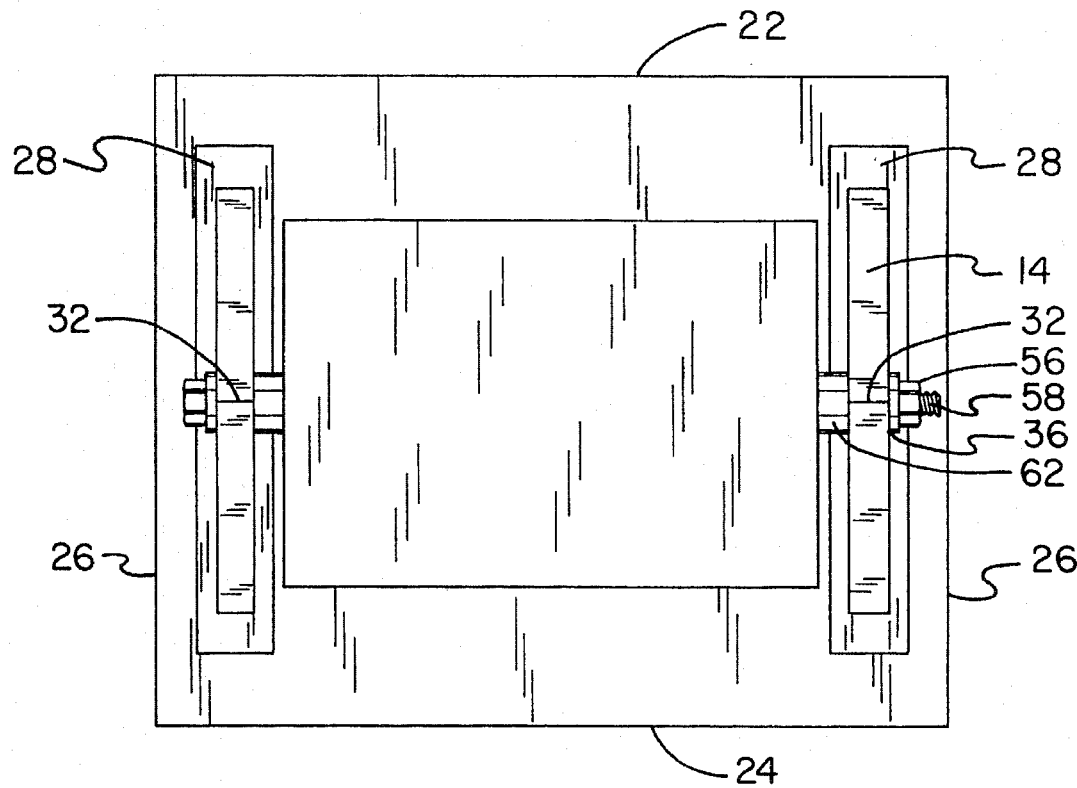
FIG. 4 is a top plan view of the remote control device carousel.
Figure 5:
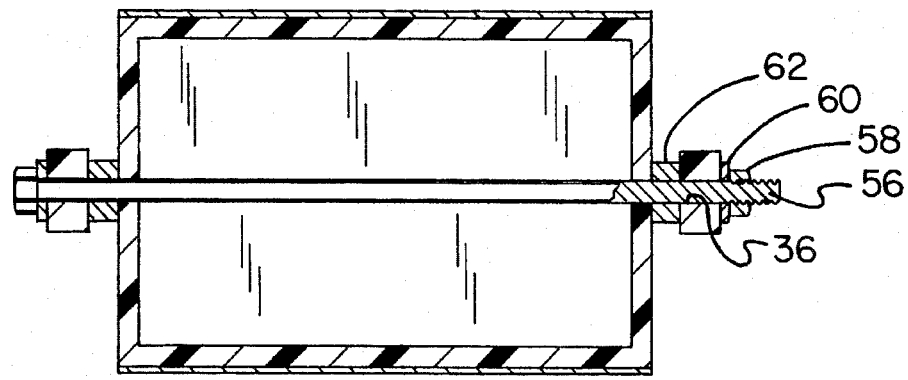
FIG. 5 is a cross sectional view of the apparatus taken along line 5.5 of FIG. 2.

The rotatable block is affixed between the triangular brackets with cooperatively coupled nuts 56 and bolts 58. Washers 60 and bushings 62 are positioned between each side face of the block and the inner surface of each bracket. The washers are positioned on the outer surface of each bracket around the apertures. The placement of the washers and bushings insures smooth and fluid rotation of the apparatus about its axis. The bolt is positioned through the washers, bushings, block and brackets with the apertures being in horizontal alignment. The nuts firmly couple the bolts in place. The block is adapted to rotate easily when touched by the user. The convenient size and rotatability of the block permit a user to easily select a desired remote control device by gently spinning the apparatus. Note FIGS. 4 and 5.

Figure 7:
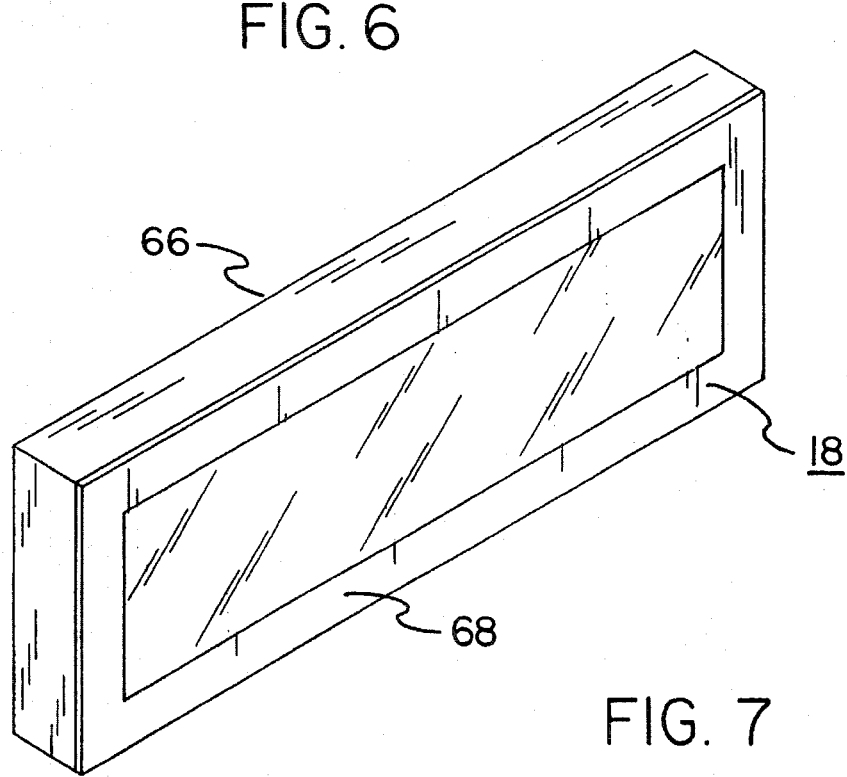
FIG. 7 is a perspective illustration of an imitation plastic remote control with a magnetic strip affixed to its surface.

A plurality of imitation plastic remote control devices 18 are formed in a generally planar rectangular orientation. The imitation devices have an upper surface 66 and a lower surface 68. The imitation devices are designed to give the appearance of a real remote control device. The lower surface includes a generally rectangular shaped magnetic strip with a self adhesive material affixed centrally thereupon. The imitation plastic devices are adapted to evenly distributed weight on the carousel when less than a full complement of four functional remote control devices are mounted thereupon. Note FIGS. 1 and 7.

The remote control device carousel is a convenient storage unit that holds up to four remote controls. The controls can be accessed by simply spinning the block on which they are stored. The storage device is made of hard plastic. Its rectangular base is approximately five inches wide by six to eight inches long. Two rectangular risers are mounted on top of the base, one at each end, and two triangular-shaped brackets are installed on top of the risers. A rectangular block with six sides is adapted to accept remote controls for a television set, cable box, video cassette recorder, and stereo. The block is mounted horizontally on an axis between the two brackets. The overall height of the storage unit is approximately eight inches. Corrosion resistant magnetic sheet metal covers each side of the block. Adhesive backed magnetic strips are used to attach the remote controls to the block.

To use the apparatus the user first affixes magnetic strips to the backs of the remote control devices. The devices are then attached to the sides of the rotating block. To access the remote controls, the user slowly spins the block. The remote controls can be easily accessed and removed from the spinning storage unit, and just as easily replaced. The apparatus eliminates the frequent searches for remote controls that most families experience.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved remote control device carousel comprising, in combination:

a base formed in a generally rectangular configuration with an upper surface, a lower surface and a small thickness therebetween, the base being positioned horizontally in the operative orientation and including parallel long side edges and parallel short side edges, a first long side edge constituting the front edge of the base, a second long side edge constituting the rear edge of the base, the two short side edges constituting the side edges of the base, the base having two generally rectangular shaped risers positioned on its upper surface, the risers being shaped as generally rectangular shaped boxes with parallel short front and rear faces, the risers also having long parallel side faces, each riser being positioned parallel to and a short distance from each side edge of the block, the risers having a shorter length than each side edge of the base and being centrally positioned between the front and rear edge thereof;

two brackets being formed as generally planar triangular shaped members, each bracket being centrally positioned upon the upper surface of each riser, the point of each triangle being positioned upwardly, the linear side edge opposite the point being positioned upon the riser, each bracket including a generally circular shaped aperture located a short distance from its apex;

a rotatable block formed as a generally rectangular shaped hollow box, the block having a front face, a rear face, two side faces, a top face and a bottom face, the outer surface of the top, bottom, and rear faces of the block including a thin layer of magnetic sheet metal, each of the side faces including an aperture at its center point, the block being affixed between the triangular brackets with cooperatively coupled nuts and bolts, washers and bushings, the bushings being positioned between each side face of the block and the inner surface of each bracket, the washers being positioned on the outer surface of each bracket around the apertures, the bolts being positioned through the washers, bushings, block and brackets with the apertures in horizontal alignment, the nuts firmly couple the bolts in place, the block being adapted to rotate easily when touched by the user; and a plurality of plastic, imitation remote control devices formed in a generally planar rectangular orientation, the imitation devices having an upper surface and a lower surface, the lower surface including a generally rectangular shaped magnetic strip with a self adhesive material affixed centrally thereupon, the imitation plastic devices adapted to evenly distributed weight on the carousel with less than a full complement of four functional remote control devices being mounted thereupon.

2. A remote control device carousel comprising:

a base formed in a generally rectangular configuration with an upper surface and a lower surface and positioned horizontally in the operative orientation, two brackets being formed as generally planar members each being centrally positioned upon the upper surface of the base, each bracket including a generally circular shaped aperture;

a rotatable block formed as a generally rectangular shaped hollow box, the outer surface of the block including a thin layer of magnetic sheet metal, each of the ends of the block including an aperture, the block being affixed between the brackets with cooperatively coupled nuts and bolts; and a plurality of plastic, imitation remote control devices formed in a generally planar rectangular configuration, the devices including magnetic coupling means attached thereto, the imitation plastic devices adapted to evenly distributed weight on the carousel with less than a full complement of remote control devices being mounted thereupon.

* * * * *